US010278258B2

United States Patent
Ido et al.

(10) Patent No.: US 10,278,258 B2
(45) Date of Patent: Apr. 30, 2019

(54) LIGHTING DEVICE, LUMINAIRE, AND SIGNBOARD

(71) Applicant: Panasonic Intellectual Property Management Co., Ltd., Osaka (JP)

(72) Inventors: Shigeru Ido, Osaka (JP); Keisuke Seki, Osaka (JP); Kazuhiko Hayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/981,553

(22) Filed: May 16, 2018

(65) Prior Publication Data

US 2018/0338364 A1   Nov. 22, 2018

(30) Foreign Application Priority Data

May 19, 2017  (JP) ................................. 2017-099800
May 19, 2017  (JP) ................................. 2017-100205

(51) Int. Cl.
*H05B 33/08* (2006.01)
*G09F 13/04* (2006.01)

(52) U.S. Cl.
CPC ......... *H05B 33/0887* (2013.01); *G09F 13/04* (2013.01); *H05B 33/0815* (2013.01); *H05B 33/0845* (2013.01)

(58) Field of Classification Search
CPC ............ H05B 33/0815; H05B 33/0833; H05B 33/0845
USPC ......................................... 315/291, 294, 297
See application file for complete search history.

(56) References Cited

U.S. PATENT DOCUMENTS

| 9,999,106 B2* | 6/2018 | Huang ............... H05B 33/0851 |
| 2011/0109241 A1* | 5/2011 | Kitamura ........... H05B 33/0815 315/291 |
| 2012/0032610 A1* | 2/2012 | Kang .................... H02M 3/156 315/297 |
| 2012/0051757 A1 | 3/2012 | Nishino |
| 2012/0206433 A1* | 8/2012 | Suzuki ............... H05B 33/0815 345/212 |
| 2014/0286645 A1 | 9/2014 | Kido |
| 2014/0334826 A1 | 11/2014 | Kido |
| 2015/0373790 A1* | 12/2015 | Boswinkel ........... H05B 33/083 315/186 |

(Continued)

FOREIGN PATENT DOCUMENTS

| JP | 2008-205036 | 9/2008 |
| JP | 2008-235186 | 10/2008 |

(Continued)

*Primary Examiner* — Tung X Le
(74) *Attorney, Agent, or Firm* — Renner, Otto, Boisselle & Sklar, LLP

(57) ABSTRACT

A lighting device is a device that is for supplying current to an LED unit, is connected to a constant current source having output terminals to which a capacitor is connected, and includes: a transistor connected in parallel with the capacitor and connected in series with the LED unit; a modulation circuit (a microcomputer of a modulator, etc.) that causes the transistor to switch ON and OFF based on a signal for visible light communication; and a constant current control circuit that maintains a current flowing through the transistor at a constant current when the current flowing through the transistor is greater than a first predetermined value.

13 Claims, 10 Drawing Sheets

(56) References Cited

U.S. PATENT DOCUMENTS

| | | | | |
|---|---|---|---|---|
| 2016/0143108 A1* | 5/2016 | Nakamura | ......... | H05B 33/0851 |
| | | | | 315/224 |
| 2017/0181236 A1* | 6/2017 | Lee | .................... | H05B 33/0815 |
| 2017/0332450 A1* | 11/2017 | Blum | ................. | H05B 33/0851 |
| 2018/0241307 A1* | 8/2018 | Zhang | .................. | H02M 3/156 |

FOREIGN PATENT DOCUMENTS

| | | |
|---|---|---|
| JP | 2009-099894 | 5/2009 |
| JP | 2009-252344 | 10/2009 |
| JP | 2010-118270 | 5/2010 |
| JP | 2011-258517 | 12/2011 |
| JP | 2013-110634 | 6/2013 |
| JP | 2013-110636 | 6/2013 |
| JP | 2013-131348 | 7/2013 |
| JP | 2014-014119 | 1/2014 |
| JP | 2014-225360 | 12/2014 |
| JP | 2015-150910 | 8/2015 |

\* cited by examiner

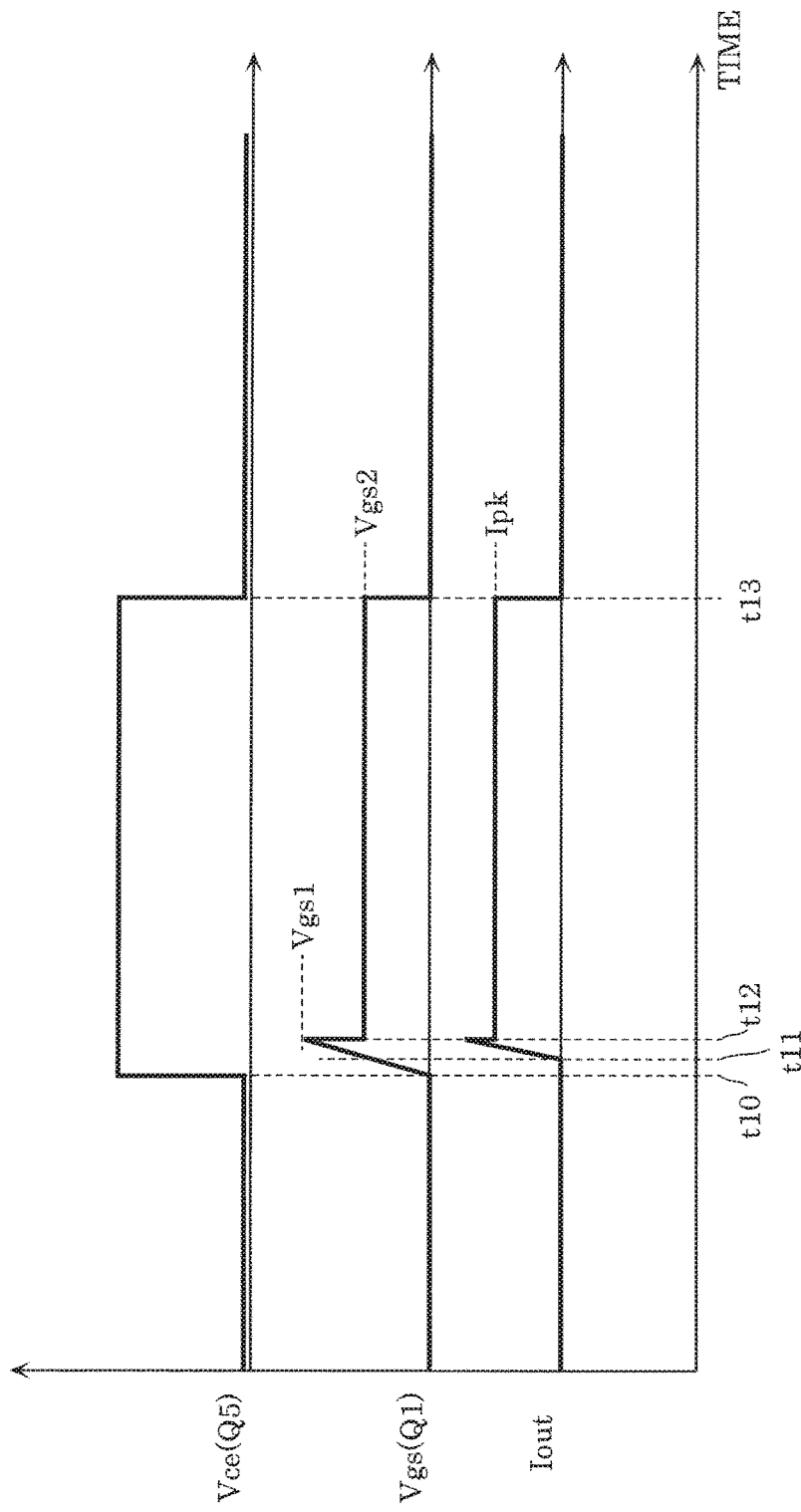

LIGHTING DEVICE, LUMINAIRE, AND SIGNBOARD

CROSS REFERENCE TO RELATED APPLICATIONS

This application claims the benefit of priority of Japanese Patent Application Number 2017-099800 filed on May 19, 2017 and Japanese Patent Application Number 2017-100205 filed on May 19, 2017, the entire contents of which are hereby incorporated by reference.

BACKGROUND

1. Technical Field

The present disclosure relates to a lighting device that supplies current to a light emitting element such as an LED, to a luminaire including the lighting device, and to a signboard including the luminaire, and relates particularly to a lighting device, etc., including a modulation circuit for visible light communication.

2. Description of the Related Art

With regard to lighting devices that supply current to a light emitting element such as an LED, lighting devices that include a modulation circuit for visible light communication have been proposed in recent years (for example, see Japanese Unexamined Patent Application Publication No. 2014-14119 and Japanese Unexamined Patent Application Publication No. 2013-110634). Such a lighting device enables a light apparatus to become a data communication apparatus, and thus a convenient wireless environment is created.

With the lighting device in Japanese Unexamined Patent Application Publication No. 2014-14119, a series circuit consisting of a resistor and a switch element is added so as to be connected in parallel to a resistor connected in series with an LED. Accordingly, a circuit for visible light communication can be readily added to a lighting device.

Furthermore, with the lighting device in Japanese Unexamined Patent Application Publication No. 2013-110634, a switch element for visible light communication is connected in series with an LED, and, in addition, a resistor is connected in parallel with the switch element. Accordingly, since an unloaded state does not occur even when the switch element is OFF, the output voltage of the constant current source is stabilized.

SUMMARY

In the lighting device in Japanese Unexamined Patent Application Publication No. 2014-14119, however, when an abnormal state occurs due to a connection defect, etc., between the lighting device and the LED, there is a risk that the LED may break down. When the output path of the constant current source is broken due to the connection defect, etc., between the lighting device and the LED, the output voltage of the constant current source rises to maximum. In this state, when the lighting device and the LED are reconnected (i.e., detached and attached), excessive current is supplied to the LED due to discharging from a smoothing capacitor connected to the output terminals of the constant current source, and thus there is a risk that the LED may break down.

Furthermore, in the lighting device in Japanese Unexamined Patent Application Publication No. 2013-110634, when the output path of the constant current source is broken due to a connection defect, etc., between the lighting device and the LED, the output voltage of the constant current source rises to maximum, and excessive voltage stress is imparted onto the modulation circuit and the LED. As a result, circuit elements included in the lighting device may break down. In addition, when the LED is reconnected to the lighting device in the aforementioned state, excessive current is supplied to the LED due to discharging from a smoothing capacitor connected to the output terminals of the constant current source, and thus there is a risk that the LED may break down.

In view of this, the present disclosure provides a lighting device, etc., that has a visible light communication function and prevents a light emitting element from breaking down even when an abnormality, such as a connection defect, etc., of the light emitting element, occurs.

A lighting device according to an aspect of the present disclosure is a lighting device is for supplying current to a light emitting element, is connected to a constant current source having output terminals to which a capacitor is connected, and includes: a switch element connected in parallel with the capacitor and connected in series with the light emitting element; a modulation circuit that causes the switch element to switch ON and OFF based on a signal for visible light communication; and a constant current control circuit that maintains a current flowing through the switch element at a constant current when the current flowing through the switch element is greater than a first predetermined value.

A lighting device according to another aspect of the present disclosure is a lighting device that is for supplying current to a light emitting element, is connected to a constant current source having output terminals to which a capacitor is connected, and includes: a series circuit connected in parallel with the capacitor and including a load line and a switch element that are connected in series with the light emitting element; a modulation circuit that causes the switch element to switch ON and OFF based on a signal for visible light communication; an overvoltage detection circuit that detects when an output voltage of the constant current source exceeds a first predetermined value, and, upon detecting that the output voltage exceeds the first predetermined value, performs output suppression control to stop operation of the constant current source or to reduce the output of the constant current source; and an abnormality detection circuit that detects an abnormal state, and, upon detecting the abnormal state, causes the switch element to switch OFF for at least a first predetermined time period, the abnormal state being at least one of an abnormality in the light emitting element, an abnormality in the load line, an abnormality in the modulation circuit, and an overloading of the switch element, wherein the constant current source causes the output voltage to rise until the output voltage exceeds the first predetermined value, when the abnormality detection circuit causes the switch element to switch OFF for at least the first predetermined time period.

A luminaire according to an aspect of the present disclosure includes: a light emitting element; and the above-described lighting device that supplies current to the light emitting element.

A signboard according to an aspect of the present disclosure includes: a light emitting element; the above-described lighting device that supplies current to the light emitting element; and a display panel that is illuminated by the light emitting element, and displays at least one of a text character and a drawing.

The present disclosure provides a lighting device, etc., that has a visible light communication function and prevents a light emitting element from breaking down even when an abnormality, such as a connection defect, etc., of the light emitting element, occurs.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 2B is a timing chart in which the vicinity of time t1 in FIG. 2A is temporally enlarged;

DETAILED DESCRIPTION OF THE EMBODIMENTS

Hereinafter, exemplary embodiments of the present disclosure shall be described in detail with reference to the drawings. It should be noted that each of the subsequently-described embodiments shows a specific example. The numerical values, shapes, materials, structural components, the arrangement, connection, and operational timing of the structural components, etc., shown in the following exemplary embodiments are mere examples, and are not intended to limit the scope of the present disclosure. Furthermore, among the structural components in the following exemplary embodiments, components not recited in any one of the independent claims which indicate the broadest concepts of the present disclosure are described as arbitrary structural components. Furthermore, the respective figures are schematic diagrams and are not necessarily precise illustrations. Furthermore, in the respective figures, substantially identical components are assigned the same reference signs, and overlapping description is omitted or simplified.

Embodiment 1

First, a lighting device according to Embodiment 1 will be described.

Figure 1:
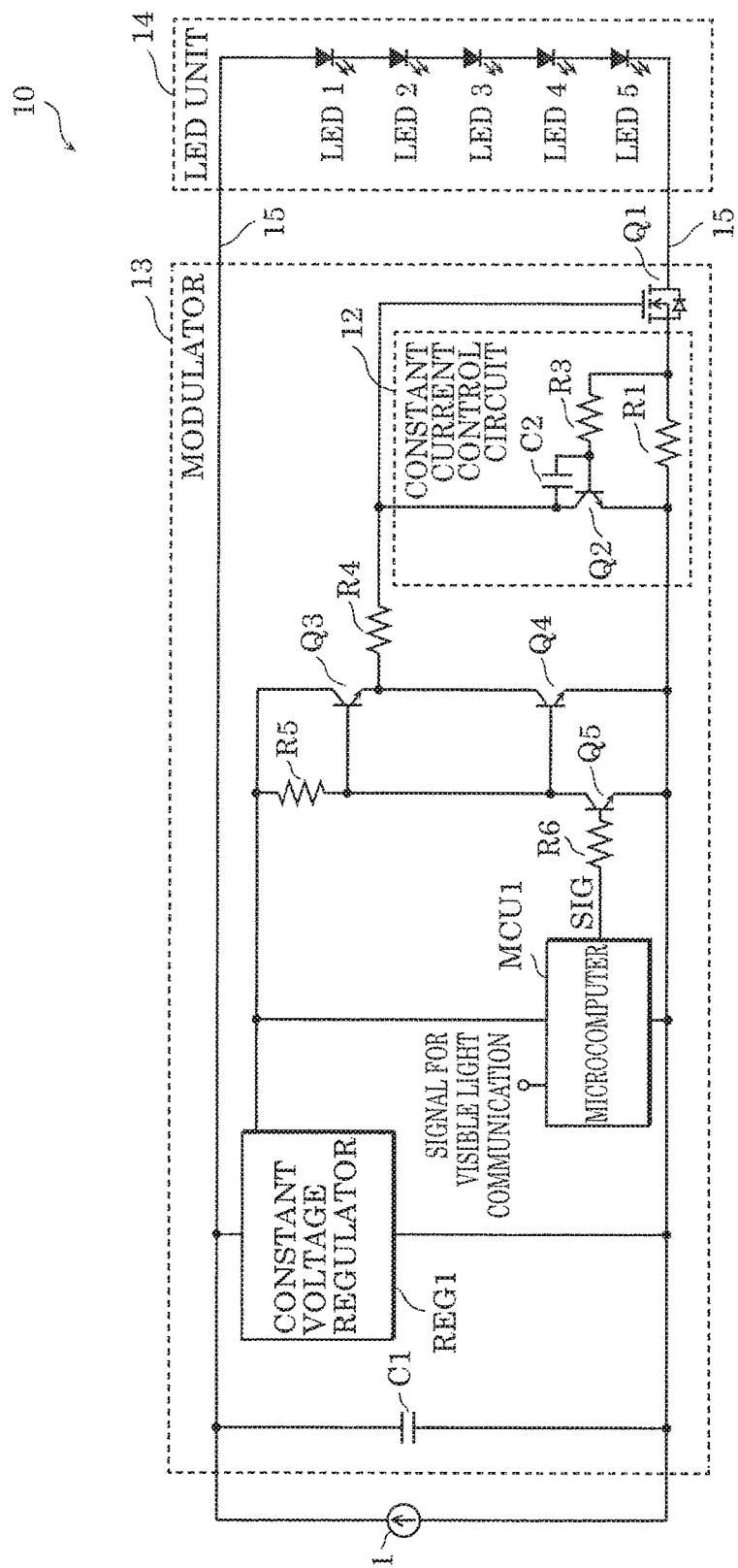
FIG. 1 is a circuit diagram of a lighting device according to Embodiment 1.

FIG. 1 is a circuit diagram of lighting device 10 according to Embodiment 1. Lighting device 10 is a device that has a function of supplying current to (i.e., causing light emission of) LED unit 14 as well as a function of performing visible light communication, and includes constant current source 11 and modulator 13.

LED unit 14 is an example of a light emitting element that is a load of lighting device 10. Here, LED unit 14 is connected to lighting device 10 by load line 15, and includes a plurality of LEDs 1 to 5 that are connected in series. It should be noted that the light emitting element is not limited to an LED, and may be a different light emitting element such as an organic EL element or an inorganic EL element. Furthermore, LED unit 14 is not limited to a plurality of LEDs connected in series, and may include a single LED, or a plurality of LEDs connected in parallel, or sets of series-connected LEDs that are connected in parallel.

Constant current source 11 is a power source that supplies a constant current to LED unit 14 which is a load, and causes its output voltage to rise to a maximum voltage when the load is disconnected.

Modulator 13 has both a function of a modulation circuit that causes transistor Q1 (an example of a first transistor), which is a switch element, to switch ON and OFF based on a signal for visible light communication and a function of a constant current control circuit that places transistor Q1 in a constant current mode when the current flowing through transistor Q1 is greater than a first predetermined value. Specifically, modulator 13 includes constant voltage regulator REG1, microcomputer MCU1, capacitors C1 and C2, transistors Q1 to Q4, and resistors R1 and R3 to R6.

Transistor Q1 is a switch element for visible light communication, and is connected in parallel with capacitor C1 and connected in series with LED unit 14. Transistor Q1 is, for example, a MOSFET.

Capacitor C1 is a smoothing capacitor connected between the two output terminals of constant current source 11. In modulator 13, as a switch element for visible light communication, transistor Q1 switches ON and OFF periodically. In an OFF period of transistor Q1, the current path is cutoff, and thus the output voltage of constant current source 11 rises. Capacitor C1 is provided in order to reduce the amount of rise of the output voltage. The capacitance of capacitor C1 may be, for example, a value by which the amount of rise ($\Delta VF$) of the output voltage during the OFF period of transistor Q1 becomes less than or equal to 30% of the forward voltage (VF) of LED unit 14. Specifically, where OFF period Toff is 208 μsec, output current Iout is 0.7 A, and forward voltage VF is 15 V, amount of rise $\Delta VF$ is 4.5 V according to $\Delta VF=15\ V\times 0.3=4.5$ V. Therefore, minimum capacitance C1min of capacitor C1 is 32.4 μF according to $C1min=Toff\times Iout/\Delta VF=208\ \mu sec\times 0.7\ A/4.5\ V\approx 32.4\ \mu F$. Therefore, the capacitance of capacitor C1 is set to at least 33 μF, for example.

Constant voltage regulator REG1 is a circuit module that generates, from the output voltage of constant current source 11, the power source voltage of a constant voltage for causing internal circuits of modulator 13 to operate. Constant voltage regulator REG1 is, for example, a small-sized switching regulator or series regulator that outputs a 5 V power source voltage.

Microcomputer MCU1 is a microcomputer that runs on the power source voltage generated by constant voltage regulator REG1. Microcomputer MCU1 is, for example, an LSI including a ROM that holds a program, a RAM that serves as a temporary storage area, a processor that executes a program, input/output circuits such as a A/D converter and a D/A converter, a counter/timer, etc. Microcomputer MCU1 functions as part of the modulation circuit. Specifically, microcomputer MCU1, in accordance with an internal program, outputs, from output terminal SIG, a drive signal for causing transistor Q1 to switch ON and OFF based on a signal for visible light communication. The signal for visible light communication represents a fixed character string determined by the internal program or a character string that can change dynamically.

Resistor R6, transistor Q5, resistor R5, transistors Q3 and Q4 form a drive circuit that drives the gate of transistor Q1, and form part of the modulation circuit. The drive circuit charges and discharges the capacitance across the gate and source of transistor Q1 so that transistor Q1 switches ON and OFF according to the drive signal from microcomputer MCU1. Specifically, when the drive signal from microcomputer MCU1 is HIGH, transistor Q5 switches ON and, consequently, transistor Q3 switches OFF and transistor Q4 switches ON. As a result, the gate of transistor Q1 is discharged via transistor Q4 and resistor R4, thereby causing the gate potential of transistor Q1 to become LOW, and thus transistor Q1 switches OFF. On the other hand, when the drive signal from MCU1 is LOW, transistor Q5 switches OFF, and, consequently, transistor Q3 switches ON and transistor Q4 switches OFF. As a result, the gate of transistor Q1 is charged via transistor Q3 and resistor R4, thereby causing the gate potential of transistor Q1 to become HIGH, and thus transistor Q1 switches ON. By causing transistor Q1 switch ON and OFF according to the drive signal from microcomputer MCU1, a digital optical code for visible light communication is superimposed onto the light emitted by LED unit 14. It should be noted that resistor R4 is a resistor that limits the charging and discharging of the gate of transistor Q1. By regulating the speed at which transistor Q1 switches ON and OFF using resistor R4, noise during the switching of transistor Q1 can be suppressed.

Capacitor C2, transistor Q2, and resistors R3 and R1 form constant current control circuit 12 that maintains the current flowing through transistor Q1 at a constant current when the current (i.e., the drain current) flowing through transistor Q1 is greater than the first predetermined value. The first predetermined value is the maximum value that can be allowed for current flowing through LED unit 14, and is for example 2 A. Since the current flowing through transistor Q1 flows through resistor R1 connected in series with transistor Q1, a voltage that is in accordance with the current flowing through transistor Q1 is generated across resistor R1. Since this voltage is applied across the base and emitter of transistor Q2, transistor Q2 switches ON when the voltage exceeds threshold voltage Vbe of transistor Q2, and the gate potential of transistor Q1 falls. Transistor Q2 is an example of a second transistor that controls the voltage of the control terminal of transistor Q1 according to the voltage generated across resistor R1. Capacitor C2 is provided for phase compensation during controlling. Normally, the value of resistor R1 is set so that the end-to-end voltage of resistor R1 does not to exceed threshold voltage Vbe of transistor Q2. When an overcurrent flows in LED unit 14, the voltage generated across resistance R1 becomes large, and, consequently, the current flowing through transistor Q2 becomes large, and transistor Q1 is controlled in the direction of being switched OFF forcibly.

Next, the operation of lighting device 10 according to Embodiment 1 configured as described above will be described.

Figure 2A:
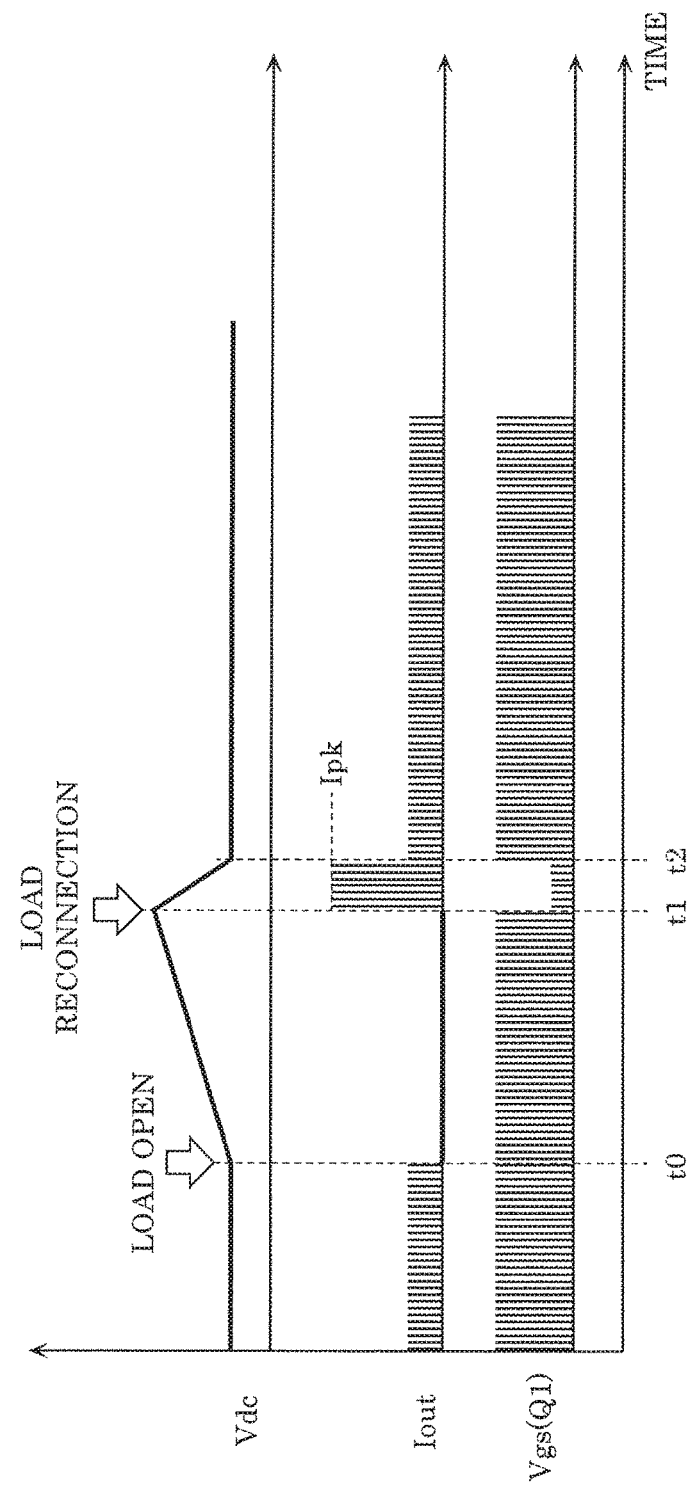
FIG. 2A is a timing chart illustrating an operation of the lighting device according to Embodiment 1.

FIG. 2A is a timing chart illustrating the operation of lighting device 10 according to Embodiment 1. The figure illustrates, from the top, output voltage Vdc of constant current source 11, current Iout flowing through LED unit 14, and gate-source voltage Vgs(Q1) of transistor Q1.

Up to time t0, lighting device 10 operates normally. Microcomputer MCU1 performs control for causing transistor Q1 to switch ON and OFF periodically based on a signal for visible light communication (see gate-source voltage Vgs(Q1)), and, as a result, current Iout flowing through LED unit 14 becomes an intermittent current. Output voltage Vdc is stabilized by capacitor C1.

At time t0, a connection defect, etc., between load line 15 and LED unit 14 causes LED unit 14 to be cut off from lighting device 10, and the current path is broken. Then, current Iout flowing through LED unit 14 becomes zero, and constant current source 11 causes output voltage Vdc to rise and charge capacitor C1. It should be noted that microcomputer MCU1 continues to perform control for causing transistor Q1 to switch ON and OFF (see gate-source voltage Vgs(Q1)).

At time t1, resolution of the connection defect, etc., between load line 15 and LED unit 14 causes LED unit 14 to be reconnected to lighting device 10, and thus the current path is placed in a conductive state. In this state, since output voltage Vdc is large and capacitor C1 is charged, when transistor Q1 switches ON when the current path becomes conductive, a large current flows to LED unit 14. At this time, constant current control circuit 12, including resistor R1, etc., detects that the current flowing through transistor Q1 is greater than the first predetermined value, and controls the current flowing through transistor Q1 so that the current flowing through transistor Q1 is maintained at a constant current (current Ipk). Specifically, gate-source voltage Vgs(Q1) of transistor Q1 is caused to fall, and the increase in the current flowing through LED unit 14 is suppressed. It should be noted that output voltage Vdc falls rapidly due to the generation of a load current.

In time t2, output voltage Vdc falls to the normal level, the current flowing through LED unit 14 also transitions to the normal level, and the constant current control by constant current control circuit 12 is terminated.

FIG. 2B is a timing chart in which the vicinity of time t1 in FIG. 2A is temporally enlarged. More specifically, FIG. 2B illustrates a timing chart around a period from when LED unit 14 is reconnected to lighting device 10 in time t1 in FIG. 2A to when transistor Q5 initially switches OFF (times t10 to t13 in FIG. 2B). This figure illustrates, from the top, collector voltage Vce(Q5) of transistor Q5, gate-source voltage Vgs(Q1) of transistor Q1, and current Iout flowing through LED unit 14.

At time t10, transistor Q5 switches OFF according to a drive signal from output terminal SIG of microcomputer MCU1, and thus collector voltage Vce(Q5) of transistor Q5 becomes HIGH. As a result, transistor Q3 switches ON, and gate-source voltage Vgs(Q1) of transistor Q1 rises.

At time t11, gate-source voltage Vgs(Q1) of transistor Q1 reaches the threshold voltage of transistor Q1, and current Iout flowing through LED unit 14 starts to rise.

At time t12, in constant current control circuit 12, current Iout flowing through resistor R1 causes the end-to-end voltage of resistor R1 to be greater than threshold voltage Vbe of transistor Q2, and thus transistor Q2 starts to switch ON. With the switching ON of transistor Q2, gate-source voltage Vgs(Q1) of transistor Q1 peaks at voltage Vgs1 and falls. Gate-source voltage Vgs(Q1) of transistor Q1 is feedback controlled by transistor Q2 such that the voltage generated across resistor R1 becomes threshold voltage Vbe of transistor Q2, and gate-source voltage Vgs(Q1) stabilizes at voltage Vgs2. As a result, from time t12 to time t13, transistor Q2 operates in the constant current mode and current Ipk flows.

At time t13, transistor Q5 switches ON according to a drive signal from output terminal SIG of microcomputer MCU1, and thus collector voltage Vce(Q5) of transistor Q5 becomes LOW. As a result, transistor Q4 switches ON, gate-source voltage Vgs(Q1) of transistor Q1 becomes substantially 0 V, and current Iout flowing through LED unit 14 becomes zero.

In this manner, lighting device 10 according to this embodiment is a device that supplies current to LED unit 14, and includes: constant current source 11; capacitor C1 connected to output terminals of constant current source 11; transistor Q1 connected in parallel with capacitor C1 and connected in series with LED unit 14; a modulation circuit (microcomputer MCU1 of modulator 13, etc.) that causes transistor Q1 to switch ON and OFF based on a signal for visible light communication; and constant current control circuit 12 that maintains a current flowing through transistor Q1 at a constant current when the current flowing through transistor Q1 is greater than a first predetermined value.

Accordingly, even when an abnormality (i.e., detachment and attachment) occurs, such as when a connection defect, etc., causes LED unit 14 and lighting device 10 to be disconnected and reconnected during light emission, the current flowing through transistor Q1 becomes a constant current after becoming greater than the first predetermined value. Therefore, supply of excess current to LED unit 14 leading to breakdown of LED unit 14 is prevented.

Furthermore, the switch element used in visible light communication is a first transistor (i.e., transistor Q1), and constant current control circuit 12 maintains the current flowing through the first transistor at the constant current by controlling a voltage of a control terminal of transistor Q1.

Accordingly, the switch element for visible light communication is also used in constant current control, thereby allowing a reduction in size of lighting device 10.

Furthermore, constant current control circuit 12 includes: resistor R1 connected in series with transistor Q1; and a second transistor (i.e., transistor Q2) that controls the voltage of the control terminal of transistor Q1 according to a voltage generated across resistor R1.

Accordingly, constant current control circuit 12 is realized with a simple configuration using resistor R1 and transistor Q2.

Embodiment 2

Next, a lighting device according to Embodiment 2 will be described.

Figure 3:
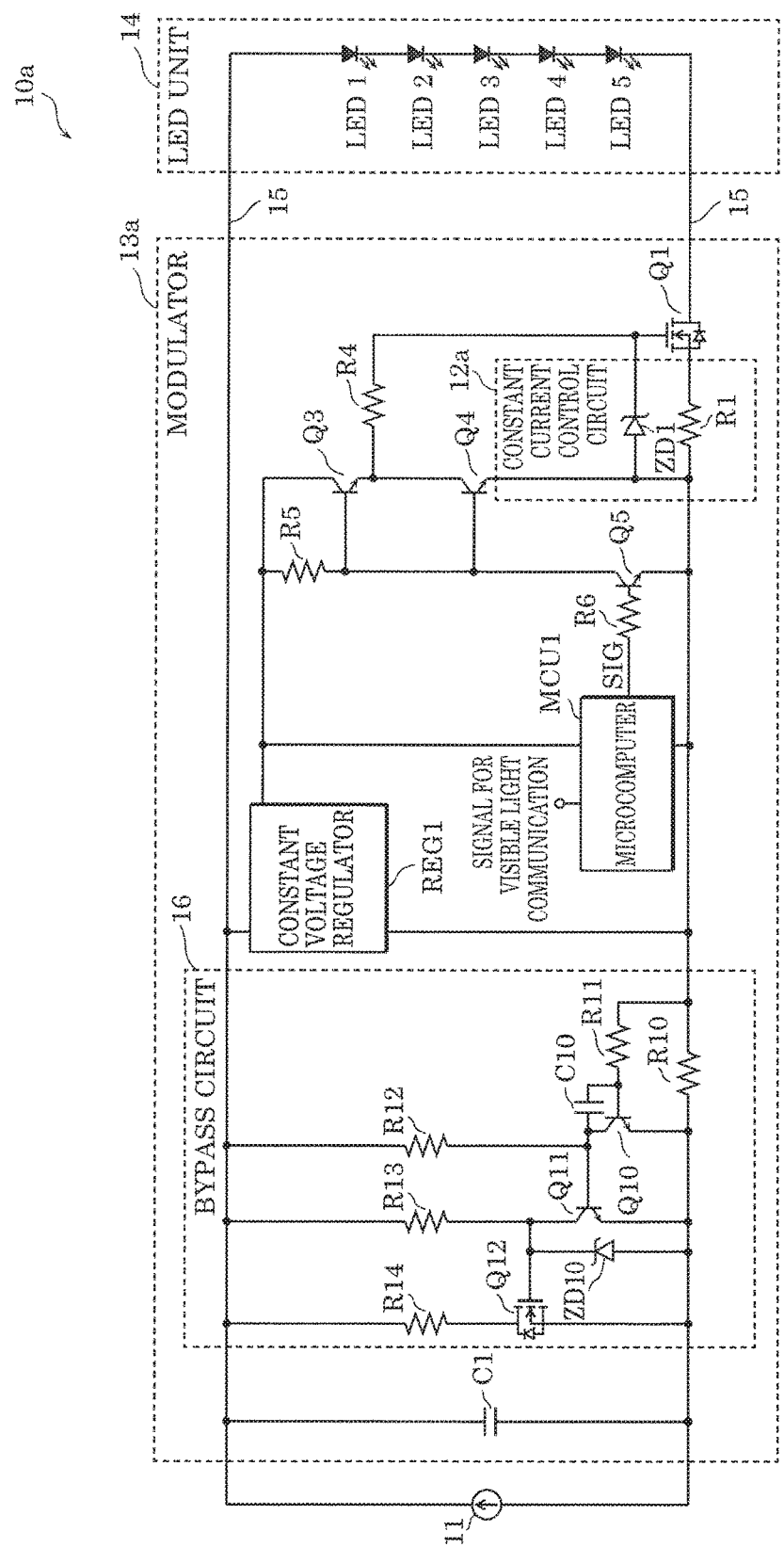
FIG. 3 is a circuit diagram of a lighting device according to Embodiment 2.

FIG. 3 is a circuit diagram of lighting device 10a according to Embodiment 2. As in Embodiment 1, lighting device 10a is a device that has a function of supplying current to (i.e., causing light emission of) LED unit 14 as well as a function of performing visible light communication, and includes constant current source 11 and modulator 13a. Lighting device 10a basically has the functions of lighting device 10 in Embodiment 1, but the configuration of modulator 13a is different from that in Embodiment 1. Specifically, modulator 13a is different from modulator 13 in Embodiment 1 in further including bypass circuit 16, and including, in place of constant current control circuit 12 in Embodiment 1, constant current control circuit 12a having a different circuit configuration. Hereinafter, description shall be focused on the points of difference with Embodiment 1.

Bypass circuit 16 is a circuit that is connected to the output terminals of constant current source 11 and causes part of the current flowing to LED unit 14 and transistor Q1 to bypass LED unit 14 and transistor Q1, and includes resistors R10 to R14, transistors Q10 to Q12, and constant voltage diode ZD10. Bypass circuit 16, as a whole, is a circuit that is connected in parallel to LED unit 14 and transistor Q1 and causes part of the current flowing to LED unit 14 and transistor Q1 to bypass LED unit 14 and transistor Q1 when the current is greater than a second predetermined value. The second predetermined value is the maximum value that can be allowed for current flowing through LED unit 14, and is for example 2 A.

More specifically, bypass circuit 16 is configured as described below. Transistor Q12 is a transistor for passing a bypass current, and is for example a power MOSFET. In general, a transistor having a rated current larger than transistor Q1 is used for transistor Q12. Resistor R14 is provided for mitigating power stress in transistor Q12. Constant voltage diode ZD10 is provided in order to limit a bias voltage when the gate of transistor Q12 is to be biased via resistor R13, when transistor Q11 is OFF. Constant voltage diode ZD10, for example, limits the gate potential of transistor Q12 to 10 V. Transistor Q11 is provided for signal inversion. Resistor R12 is a resistor for biasing a base of transistor Q11.

Transistor Q10 is a current control transistor, and controls the base potential of transistor Q12 so that a detection voltage generated due to the load current flowing through resistor R10 becomes threshold voltage Vbe of transistor Q10. The base current of transistor Q10 is limited by resistor R11. Capacitor C10 is provided for phase compensation during controlling.

Constant current control circuit 12a basically has the same function as in Embodiment 1, that is, the function of maintaining the current flowing through transistor Q1 at a constant current when the current flowing through transistor Q1 is greater than the first predetermined value, but includes a circuit different from Embodiment 1. Specifically, constant current control circuit 12a includes resistor R1 connected in series with transistor Q1, and constant voltage diode ZD1 connected between one end of resistor R1 and a control terminal (gate) of transistor Q1. When the current flowing through resistor R1 causes the voltage generated across resistor R1 to be greater than the sum of the breakdown voltage of constant voltage diode ZD1 and the threshold voltage of transistor Q1 (i.e., greater than the first predetermined voltage), the gate potential of transistor Q1 falls and the current flowing through transistor Q1 is limited. In other words, transistor Q1 operates in the constant current mode.

Next, the operation of lighting device 10a according to Embodiment 2 configured as described above will be described.

Figure 4:
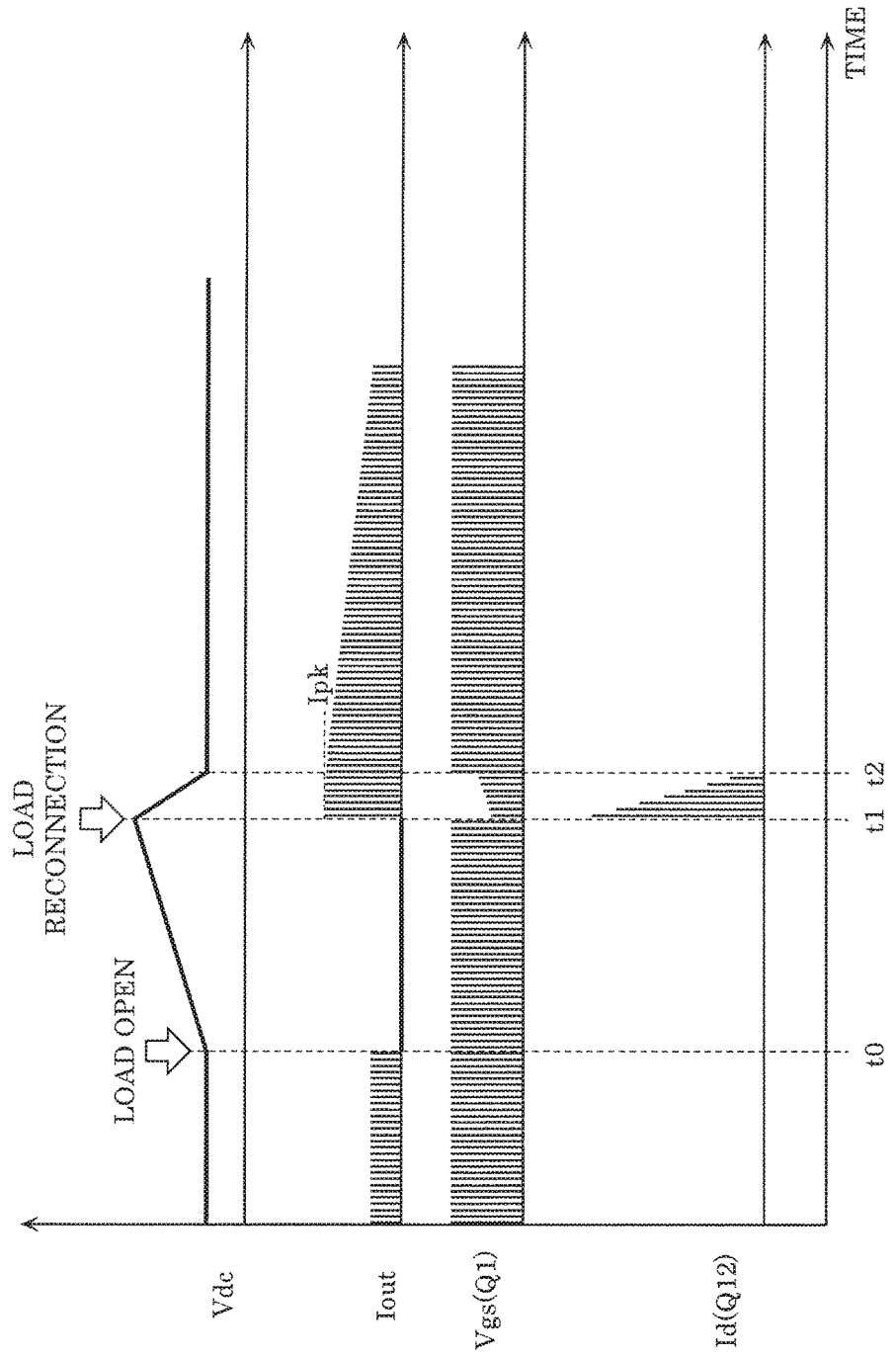
FIG. 4 is a timing chart illustrating an operation of the lighting device according to Embodiment 2.

FIG. 4 is a timing chart illustrating the operation of lighting device 10a according to Embodiment 2. The figure illustrates, from the top, output voltage Vdc of constant current source 11, current Iout flowing through LED unit 14, gate-source voltage Vgs(Q1) of transistor Q1, and current (i.e., drain current) Id(Q12) flowing through transistor Q12.

Up to time t0, lighting device 10a operates normally. Microcomputer MCU1 performs control for causing transistor Q1 to switch ON and OFF periodically based on a signal for visible light communication (see gate-source voltage Vgs(Q1)), and, as a result, current Iout flowing through LED unit 14 becomes an intermittent current. Output voltage Vdc is stabilized by capacitor C1. The voltage generated across resistor R10 is less than or equal to threshold voltage Vbe of transistor Q10, and, as a result, transistor Q10 switches OFF, transistor Q11 switches ON, and transistor Q12 switches OFF (see drain current Id(Q12)).

At time t0, a connection defect, etc., between load line 15 and LED unit 14 causes LED unit 14 to be cut off from lighting device 10a, and thus the current path is broken. Then, current Iout flowing through LED unit 14 becomes zero, and constant current source 11 causes output voltage Vdc to rise and charges capacitor C1. It should be noted that microcomputer MCU1 continues to perform control for causing transistor Q1 to switch ON and OFF (see gate-source voltage Vgs(Q1)).

At time t1, resolution of the connection defect, etc., between load line 15 and LED unit 14 causes LED unit 14 to be reconnected to lighting device 10a, and the current path is placed in a conductive state. In this state, since output voltage Vdc is large and capacitor C1 is charged, when transistor Q1 switches ON when the current path becomes conductive, a large current flows to LED unit 14. At this time, in constant current control circuit 12a, the voltage generated across resistor R1 becomes greater than the sum of the breakdown voltage of constant voltage diode ZD1 and the threshold voltage of transistor Q1 (i.e., greater than the first predetermined voltage), and thus the gate potential of transistor Q1 falls and the current flowing through transistor Q1 is limited. In other words, transistor Q1 operates in the constant current mode.

Furthermore, in bypass circuit 16, the voltage generated across resistor R10 rises, transistor Q10 switches ON, transistor Q11 switches OFF, and transistor Q12 switches ON, and, as a result, bypass current flows to transistor Q12 via resistor R14. In other words, the current flowing to LED unit 14 and transistor Q1 becomes greater than the second predetermined value, and bypass current flows into bypass circuit 16. With the flow of bypass current, the charge in capacitor C1 is discharged, and output current Vdc falls rapidly.

In time t2, output voltage Vdc falls to the normal level, the current flowing through LED unit 14 also transitions to the normal level, and the constant current control by constant current control circuit 12a is terminated. In addition, transistor Q10 switches OFF, transistor Q11 switches ON, and transistor Q12 switches OFF, and, as a result, the bypass current caused by transistor Q12 runs out.

In this manner, lighting device 10a according to this embodiment, as in Embodiment 1, is a device that supplies current to LED unit 14, and includes: constant current source 11; capacitor C1 connected to output terminals of constant current source 11; transistor Q1 connected in parallel with capacitor C1 and connected in series with LED unit 14; a modulation circuit (microcomputer MCU1 of modulator 13, etc.) that causes transistor Q1 to switch ON and OFF based on a signal for visible light communication; and constant current control circuit 12a that maintains a current flowing through transistor Q1 at a constant current when the current flowing through transistor Q1 is greater than a first predetermined value.

Accordingly, even when an abnormality (i.e., detachment and attachment) occurs, such as when a connection defect, etc., causes LED unit 14 and lighting device 10a to be disconnected and reconnected during light emission, the current flowing through transistor Q1 becomes a constant current after becoming greater than the first predetermined value. Therefore, supply of excess current to LED unit 14 leading to breakdown of LED unit 14 is prevented.

Furthermore, in lighting device 10a according to this embodiment, constant current control circuit 12a includes resistor R1 connected in series with transistor Q1, and constant voltage diode ZD1 connected between one end of resistor R1 and a control terminal (gate) of transistor Q1.

Accordingly, the switch element for visible light communication is also used in constant current control, thereby allowing a reduction in size of lighting device 10. Furthermore, constant current control circuit 12a is realized with a simple configuration using resistor R1 and constant voltage diode ZD1.

Furthermore, lighting device 10a according to this embodiment further includes bypass circuit 16 that is connected to the output terminals of constant current source 11, and causes part of a current flowing to LED unit 14 and transistor Q1 to bypass LED unit 14 and transistor Q1. Bypass circuit 16 causes the part of the current flowing to LED unit 14 and transistor Q1 to bypass LED unit 14 and transistor Q1 when the current flowing to LED unit 14 and transistor Q1 is greater than a second predetermined value.

Accordingly, even when an abnormality occurs, such as when a connection defect, etc., causes LED unit 14 and lighting device 10 to be disconnected and reconnected during light emission, current is bypassed from constant current source 11, thereby preventing overcurrent from flowing to LED unit 14 and transistor Q1. Therefore, supply of excess current to LED unit 14 leading to breakdown of LED unit 14 is prevented.

Furthermore, although, in Embodiment 1, power stress on transistor Q1 tends to increase when the capacitance of capacitor C1 is large, bypass circuit 16 in this embodiment reduces such power stress.

Furthermore, since surge power is absorbed by resistor R14, lighting device 10a can be designed without increasing the size of transistor Q12.

Embodiment 3

Next, a lighting device according to Embodiment 3 will be described.

Figure 5:
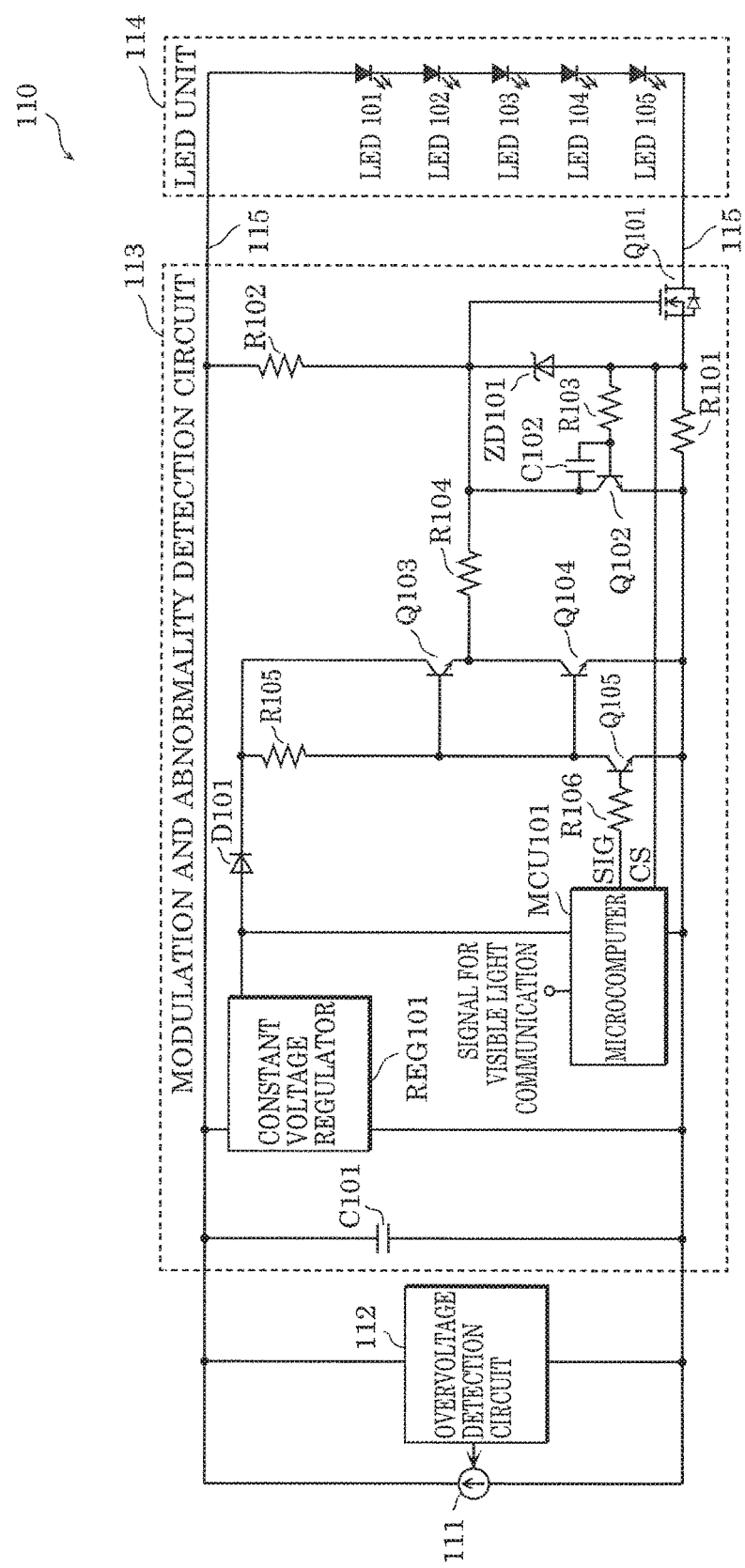
FIG. 5 is a circuit diagram of a lighting device according to Embodiment 3.

FIG. 5 is a circuit diagram of lighting device 110 according to Embodiment 3. Lighting device 110 is a device that has a function of supplying current to (i.e., causing light emission of) LED unit 114 as well as a function of performing visible light communication, and includes constant current source 111, overvoltage detection circuit 112, and modulation and abnormality detection circuit 113.

LED unit 114 is an example of a light emitting element that is a load of lighting device 110. Here, LED unit 114 is connected to lighting device 110 by load line 115, and includes a plurality of LEDs 101 to 105 that are connected in series. It should be noted that the light emitting element is not limited to an LED, and may be a different light emitting element such as an organic EL element or an inorganic EL element. Furthermore, LED unit 114 is not limited to a plurality of LEDs connected in series, and may include a single LED, or a plurality of LEDs connected in parallel, or sets of series-connected LEDs that are connected in parallel.

Constant current source 111 is a power source that supplies constant current to LED unit 114 which is a load. Constant current source 111 causes its output voltage to rise to a maximum voltage when the load is disconnected. For example, when transistor Q101 is switched OFF for at least a first predetermined time period (for example, 10 msec.), constant current source 111 causes its output voltage to rise until the output voltage exceeds a first predetermined value. The first predetermined value is, for example, a value greater than or equal to 86 V when the forward voltage of LED unit 114 is 15 V to 78 V.

Overvoltage detection circuit 112 performs output suppression control to stop operation of constant current source 111 or reduce the current outputted by constant power source 111, when overvoltage detection circuit 112 detects that the output voltage of constant current source 111 exceeds the first predetermined value. Overvoltage detection circuit 112 includes, for example, a resistance voltage-dividing circuit that detects the output voltage, a constant current diode that determines the first predetermined value, a comparator that compares the voltage obtained by the resistance voltage-dividing circuit and the voltage obtained by the constant voltage diode. Furthermore, overvoltage detection circuit 112 terminates the output suppression control when the output voltage falls below a third predetermined value, less than the first predetermined value, after exceeding the first predetermined value or when a third predetermined time period passes after the output voltage exceeds the first predetermined value. Accordingly, constant current source 111 returns to normal operation. The third predetermined value is a threshold value at which modulation and abnormality detection circuit 113 can be reset and restarted, and is for example 3 V. The third predetermined time period is the time period from when the output voltage of constant current source 111 exceeds the first predetermined value and overvoltage detection circuit 112 stops the operation of constant current source 111 to when the end-to-end voltage of capacitor C101 becomes 0 V, and is for example 1 sec.

Modulation and abnormality detection circuit 113 is a circuit having both a function of a modulation circuit that causes transistor Q101, which is a switch element, to switch ON and OFF based on a signal for visible light communication and a function of an abnormality detection circuit that causes transistor Q101 to switch OFF for at least a first predetermined time period when modulation and abnormality detection circuit 113 detects an abnormal state. Specifically, modulation and abnormality detection circuit 113 includes constant voltage regulator REG101, microcomputer (microcomputer) MCU101, capacitors C101 and C102, diode D101, constant voltage diode ZD101, transistors Q101 to Q104, and resistors R101 to R106.

Capacitor C101 is a smoothing capacitor connected to the output terminals (i.e., between the two output terminals) of constant current source 111. In modulation and abnormality detection circuit 113, transistor Q101 is provided as a switch element for visible light communication, and transistor Q101 switches ON and OFF periodically. Transistor Q101 is, for example, a MOSFET. In an OFF period of transistor Q101, the current path is cutoff, and thus the output voltage of constant current source 111 rises. Capacitor C101 is provided in order to reduce the amount of rise. The capacitance of capacitor C101 may be, for example, a value by which the amount of rise ($\Delta VF$) of the output voltage during the OFF period of transistor Q101 becomes less than or equal to 30% of the forward voltage (VF) of LED unit 114. Specifically, when OFF period Toff is 208 μsec, output current Iout is 0.7 A, and forward voltage VF is 15 V, amount of rise $\Delta VF$ is 4.5 V according to $\Delta VF = 15\ V \times 0.3 = 4.5\ V$. Therefore, minimum capacitance C101$min$ of capacitor C101 is 32.4 μF according to C101$min$=Toff×Iout/$\Delta VF$=208 μsec×0.7 A/4.5 V≈32.4 μF. Therefore, the capacitance of capacitor C101 is set to at least 33 μF, for example.

Constant voltage regulator REG101 is a circuit module that generates, from the output voltage of constant current source 111, the power source voltage of a constant voltage for causing internal circuits of modulation and abnormality detection circuit 113 to operate. Constant voltage regulator REG101 is, for example, a small-sized switching regulator or series regulator that outputs a 5 V power source voltage.

Microcomputer MCU101 is a microcomputer that runs on the power source voltage generated by constant voltage regulator REG101. Microcomputer MCU101 is, for example, an LSI including a ROM that holds a program, a RAM that serves as a temporary storage area, a processor that executes a program, input/output circuits such as a A/D converter and a D/A converter, a counter/timer, etc. Microcomputer MCU101 functions as part of the modulation circuit. Specifically, microcomputer MCU101, in accordance with an internal program, outputs, from output terminal SIG, a drive signal for causing transistor Q101 to switch ON and OFF based on a signal for visible light communication. The signal for visible light communication represents a fixed character string determined by the internal program or a character string that can change dynamically.

Resistor R106, transistor Q105, resistor R105, and transistors Q103 and Q104 form a drive circuit that drives the gate of transistor Q101, and form part of the modulation circuit. The drive circuit charges and discharges the capacitance across the gate and source of transistor Q101 so that transistor Q101 switches ON and OFF according to the drive signal from microcomputer MCU101. Specifically, when the drive signal from microcomputer MCU101 is HIGH, transistor Q105 switches ON and, consequently, transistor Q103 switches OFF and transistor Q104 switches ON. As a result, the gate of transistor Q101 is discharged via transistor Q104 and resistor R104, thereby causing the gate potential of transistor Q101 to become LOW, and thus transistor Q101 switches OFF. On the other hand, when the drive signal from MCU101 is LOW, transistor Q105 switches OFF, and, consequently, transistor Q103 switches ON and transistor Q104 switches OFF. As a result, the gate of transistor Q101 is charged via transistor Q103 and resistor R104, thereby causing the gate potential of transistor Q101 to become HIGH, and thus transistor Q101 switches ON. By causing transistor Q101 to switch ON and OFF according to the drive signal from microcomputer MCU101, a digital optical code for visible light communication is superimposed onto the light emitted by LED unit 114. It should be noted that resistor R104 is a resistor that limits the charging and discharging of the gate of transistor Q101. By regulating the speed at which transistor Q101 switches ON and OFF using regulator R104, noise during the switching of transistor Q101 can be suppressed.

Furthermore, microcomputer MCU101 also functions as part of an abnormality detection circuit that causes transistor Q101 to switch OFF for at least a first predetermined time period (for example, 10 msec.) when microcomputer MCU101 detects an abnormal state in lighting device 110. Specifically, microcomputer MCU101 receives, via input terminal CS, the voltage generated across resistor R101 due to the current (i.e., the drain current) flowing through transistor Q101, and periodically converts the voltage into a digital value using the internal A/D converter. In addition, microcomputer MCU101 repeats calculating the average of the digital value for a fixed time period. Then, microcomputer MCU101 determines whether an abnormal state has occurred by determining whether the calculated average is outside a predetermined range, and performs control to cause transistor Q101 to switch OFF for at least the first predetermined time period when microcomputer MCU101 determines that an abnormal state has occurred. The predetermined range is the range of voltage that can be generated across resistor R101 due to the current flowing through transistor Q101 when lighting device 110 operates normally.

The abnormal state detected by Microcomputer MCU101 includes at least one of an abnormality in LED unit 114, an abnormality in load line 115, an abnormality in the modulation circuit, and overloading of transistor Q101. Transistor Q101 and load line 115 form a series circuit connected in parallel with capacitor C101 and connected in series with LED unit 114. Therefore, abnormality in LED unit 114, an abnormality in load line 115, and overloading of transistor Q101 can cause breakage of the circuit path or short-circuiting of components of the series circuit. It should be noted that "abnormality" includes, not only breakdown and damage, but also a connection defect, poor contact, detachment and attachment (repeated disconnection and reconnection) between components of the series circuit, breakage of the current path, short-circuiting of components of the series circuit, etc.

Resistor R102 is a resistor for applying a bias voltage to transistor Q101. With this bias voltage, transistor Q101 switches ON automatically before microcomputer MCU101 starts up, when power to lighting device 110 is switched ON.

Constant voltage diode ZD101 is a Zener diode for limiting the voltage to be applied to the gate of transistor Q101. When bias voltage is applied to the gate of transistor Q101 via resistor R102, the gate insulating film of transistor Q101 is destroyed when the bias voltage is too high. Constant voltage diode ZD101 is provided to prevent this. Constant voltage diode ZD101, for example, limits the gate potential of transistor Q101 to 10 V.

Diode D101 is a diode for preventing backflow. When transistor Q101 switches ON automatically via resistor R102, a current heading toward constant voltage regulator REG101 via resistor R104, the emitter of transistor Q104, the base of transistor Q104, and resistor R105, can be generated Diode D101 is provided to prevent such a current. With diode D101, transistor Q101 can switch ON reliably before constant voltage regulator REG101 starts up.

Capacitor C102, transistor Q102, and resistors R103 and R101 form a current limiting circuit that limits the current that flows to transistor Q101. Since the current flowing through transistor Q101 flows through resistor R101, a voltage that is in accordance with the current flowing through transistor Q101 is generated across resistor R101. Since this voltage is applied across the base and emitter of transistor Q102, transistor Q102 switches ON when the voltage exceeds threshold voltage Vbe of transistor Q102, and the gate potential of transistor Q101 falls. Capacitor C102 is provided for phase compensation during controlling. Normally, the value of resistor R101 is set so that the end-to-end voltage of resistor R101 does not to exceed threshold voltage Vbe of transistor Q102. When short-circuiting of the load during light emission or overcurrent in the load due to overvoltage occurs, the voltage generated across resistance R101 becomes large, and, consequently, the current flowing through transistor Q102 becomes large, and transistor Q101 is controlled toward being switched OFF forcibly.

Next, the operation of lighting device 110 according to Embodiment 3 configured as described above will be described.

Figure 6:
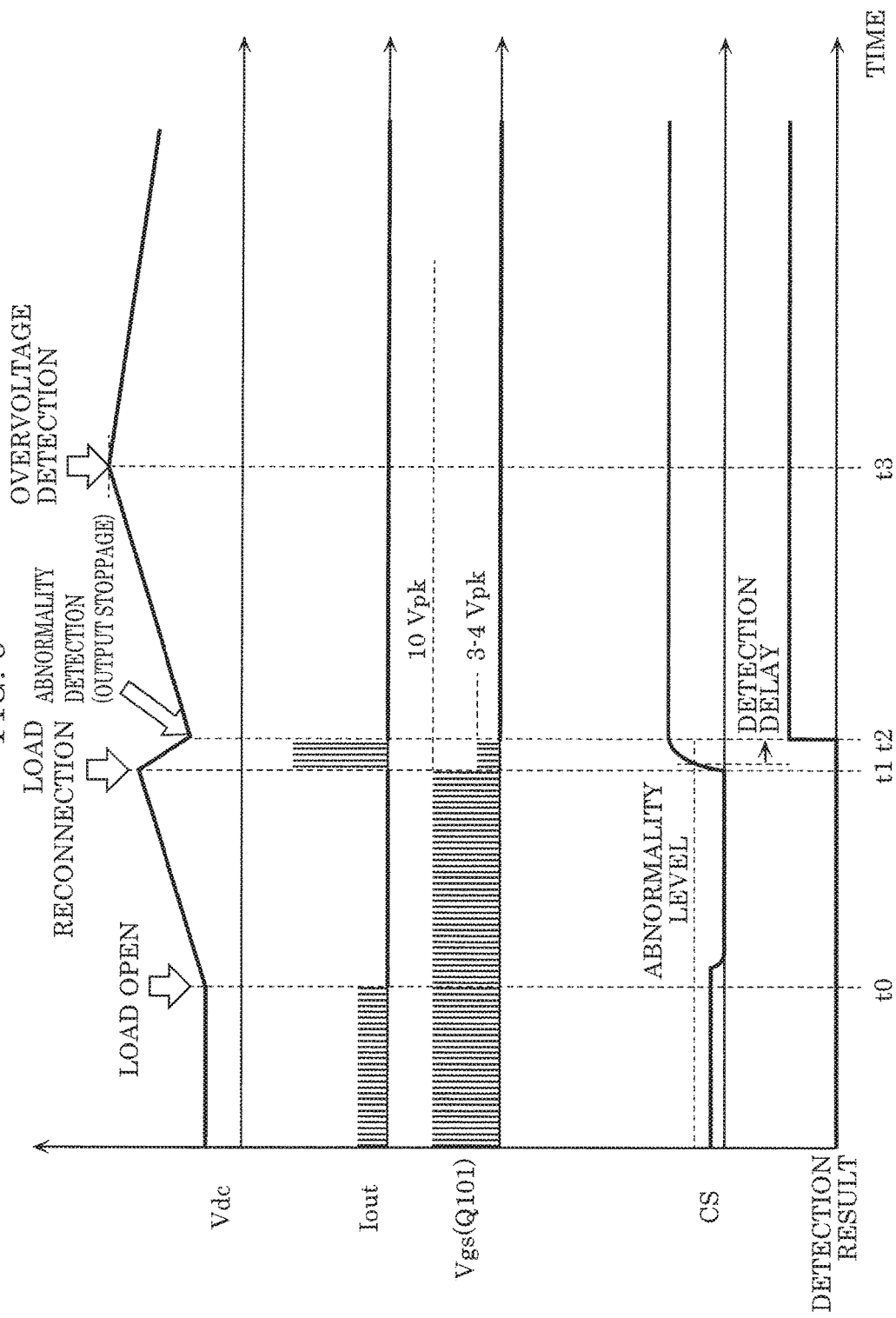
FIG. 6 is a timing chart illustrating an operation of the lighting device according to Embodiment 3.

FIG. 6 is a timing chart illustrating the operation of lighting device 110 according to Embodiment 3. The figure illustrates, from the top, output voltage Vdc of constant current source 111, current Iout flowing through LED unit 114, gate-source voltage Vgs(Q101) of transistor Q101, the voltage in input terminal CS of microcomputer MCU101, and a "detection result" of microcomputer MCU101. It should be noted that in the "detection result", HIGH is the state in which an abnormal state is detected and LOW is the state in which an abnormal state is not detected.

Up to time to, lighting device 110 operates normally. Microcomputer MCU101 performs control for causing transistor Q101 to switch ON and OFF periodically based on a signal for visible light communication (see gate-source voltage Vgs(Q101)), and, as a result, current Iout flowing through LED unit 114 becomes an intermittent current. Output voltage Vdc is stabilized by capacitor C101. The voltage in input terminal CS of microcomputer MCU101 is also in a normal state.

At time t0, a connection defect, etc., between load line 115 and LED unit 114 causes LED unit 114 to be cut off from lighting device 110, and the current path is broken. Then, current Iout flowing through LED unit 114 becomes zero and all of the current from constant current source 111 flows to capacitor C101, and, as a result, causes output voltage Vdc to rise. It should be noted that microcomputer MCU101 continues to perform control for causing transistor Q101 to switch ON and OFF (see gate-source voltage Vgs(Q101)).

At time t1, resolution of the connection defect, etc., between load line 115 and LED unit 114 causes LED unit 114 to be reconnected to lighting device 110, and the current path is placed in a conductive state. In this state, since output voltage Vdc is large and capacitor C101 is charged, when transistor Q101 switches ON when the current path becomes conductive, a large current flows to LED unit 114. Accordingly, the voltage in input terminal CS of microcomputer MCU101 rises. It should be noted that, because of the current limiting circuit including resistor R101, etc., the peak of gate-source voltage Vgs(Q101) of transistor Q101 temporarily falls to 3 to 4 V, and thus an increase in the current flowing through LED unit 114 is suppressed. Output voltage Vdc falls rapidly due to the generation of a load current.

From time t1 to t2, the voltage of input terminal CS of microcomputer MCU101 rises and reaches an abnormal level, and thus microcomputer MCU101 starts measuring the time period for which the voltage in input terminal CS exceeds the abnormal level, using an internal counter.

At time t2, when microcomputer MCU101 detects that the time period for which the voltage in input terminal CS exceeds the abnormal level has reached a predetermined time period, microcomputer MCU101 determines that an abnormal state has occurred, and performs control to cause transistor Q101 to switch OFF for at least the first predetermined time period. When transistor Q101 switches OFF, current Iout flowing through LED unit 114 becomes zero again, and the rise of output voltage Vdc caused by constant current source 111 resumes. The first predetermined time period is at least a time period required for output voltage Vdc to reach a voltage (i.e., the first predetermined value) that would be determined as an overvoltage by overvoltage detection circuit 112, and is for example 10 msec.

At time t3, when output voltage Vdc reaches the first predetermined value (for example, 86 V), overvoltage detection circuit 112 determines that an overvoltage has been generated, and performs output suppression control by controlling constant current source 111. Specifically, by controlling constant current source 111, overvoltage detection circuit 112 performs output suppression control to stop operation of constant current source 111 or reduce the current outputted by constant power source 111 (here, the operation of constant current source 111 is stopped).

In this manner, lighting device 110 according to this embodiment, is a device that supplies current to LED unit 114 and includes: constant current source 111; overvoltage detection circuit 112 that detects when an output voltage of constant current source 111 exceeds a first predetermined value, and, upon detecting that the output voltage exceeds the first predetermined value, performs output suppression control to stop operation of the constant current source or to reduce the output of the constant current source; capacitor C101 connected to output terminals of constant current source 111; a series circuit connected in parallel with capacitor C101 and including load line 115 and transistor Q101 that are connected in series with LED unit 114; and modulation and abnormality detection circuit 113 that functions as a modulation circuit that causes transistor Q101 to switch ON and OFF based on a signal for visible light communication and an abnormality detection circuit that detects an abnormal state which is at least one of an abnormality in the light emitting element, an abnormality in the load line, an abnormality in the modulation circuit, and overloading of the switch element, and, upon detecting the abnormal state, causes transistor Q101 to switch OFF for at least a first predetermined time period. Constant current source 111 causes the output voltage to rise until the output voltage exceeds the first predetermined value, when the abnormality detection circuit causes transistor Q101 to switch OFF for at least the first predetermined time period.

Accordingly, when an abnormal state is detected by the abnormality detection circuit (i.e., modulation and abnormality detection circuit 113), transistor Q101 for modulation is caused to switch OFF for at least the first predetermined time period, and the output voltage of constant current source 111 exceeds the first predetermined value. As a result, this is detected by overvoltage detection circuit 112, and overvoltage detection circuit 112 performs output suppression control to stop operation of constant current source 111 or reduce the current outputted by constant power source 111. In this manner, even when an abnormality such as a connection defect, etc., in LED unit 114 occurs, the cooperation between the abnormality detection circuit (i.e., modulation and abnormality detection circuit 113) and overvoltage detection circuit 112 prevents circuit elements included in lighting device 110 from breaking down due to the abnormality.

Furthermore, at time t3 and onward, overvoltage detection circuit 112 terminates the output suppression control when output voltage Vdc falls below a third predetermined value less than the first predetermined value after exceeding the first predetermined value or when a third predetermined time period passes after output voltage Vdc exceeds the first predetermined value.

Specifically, when output voltage Vdc becomes less than or equal to 3 V, the power source voltage supplied from constant voltage regulator REG101 to microcomputer MCU101 becomes a reset voltage, and thus microcomputer MCU101 restarts. In view of this, after several hundred msec. from when output voltage Vdc falls below 3 V, which is the third predetermined value, overvoltage detection circuit 112 terminates the output suppression control on constant current source 111. As a result, constant current source 111 restarts normally, constant voltage regulator REG101 outputs a normal (for example, 5 V) power source voltage, and microcomputer MCU101 also restarts normally. It should be noted that, if the time period (for example, 1 sec.) from when the outputting of constant current source 111 is stopped by overvoltage detection circuit 112 to when the end-to-end voltage of capacitor C101 becomes substantially 0 V is known in advance, such time period may be set as the third predetermined time period, and the output suppression control may be terminated. Specifically, when the third predetermined time period passes after voltage Vdc exceeds the first predetermined value, overvoltage detection circuit 112 may terminate the output suppression control.

In this manner, with lighting device 110 according to this embodiment, the output suppression control by overvoltage detection circuit 112 is terminated when the abnormal state caused by a temporary abnormality such as a connection defect is resolved. Therefore, lighting device 110 is rehabilitated automatically, without power to lighting device 110 being turned OFF and ON.

Furthermore, at time t3 and onward, the abnormality detection circuit may, likewise, terminate detection of the abnormal state when output voltage Vdc falls below a fourth predetermined value less than the first predetermined value after exceeding the first predetermined value or when a fourth predetermined time period passes after output voltage Vdc exceeds the first predetermined value.

Specifically, when output voltage Vdc falls below a fourth predetermined value (for example, several V), which is less than the first predetermined value, after exceeding the first predetermined value, microcomputer MCU101 terminates the abnormality determination, terminates the OFF control on transistor Q101, and performs normal ON and OFF control. Alternatively, when a fourth predetermined time period passes after output voltage Vdc exceeds the first predetermined value, MCU101 terminates the abnormality determination, terminates the OFF control on transistor Q101, and performs normal ON and OFF control. The fourth predetermined time period is, for example, a time period required for output voltage Vdc to fall to several V from when the output of constant current source 111 is stopped after output voltage Vdc exceeds the first predetermined value, and is for example 1 sec.

Accordingly, since the abnormality determination by the abnormality detection circuit (specifically, microcomputer MCU101) is terminated when the abnormal state caused by a temporary abnormality such as a connection defect is resolved, lighting device 110 is rehabilitated automatically, without power to lighting device 110 being turned OFF and ON.

Embodiment 4

Next, a lighting device according to Embodiment 4 will be described.

Figure 7:
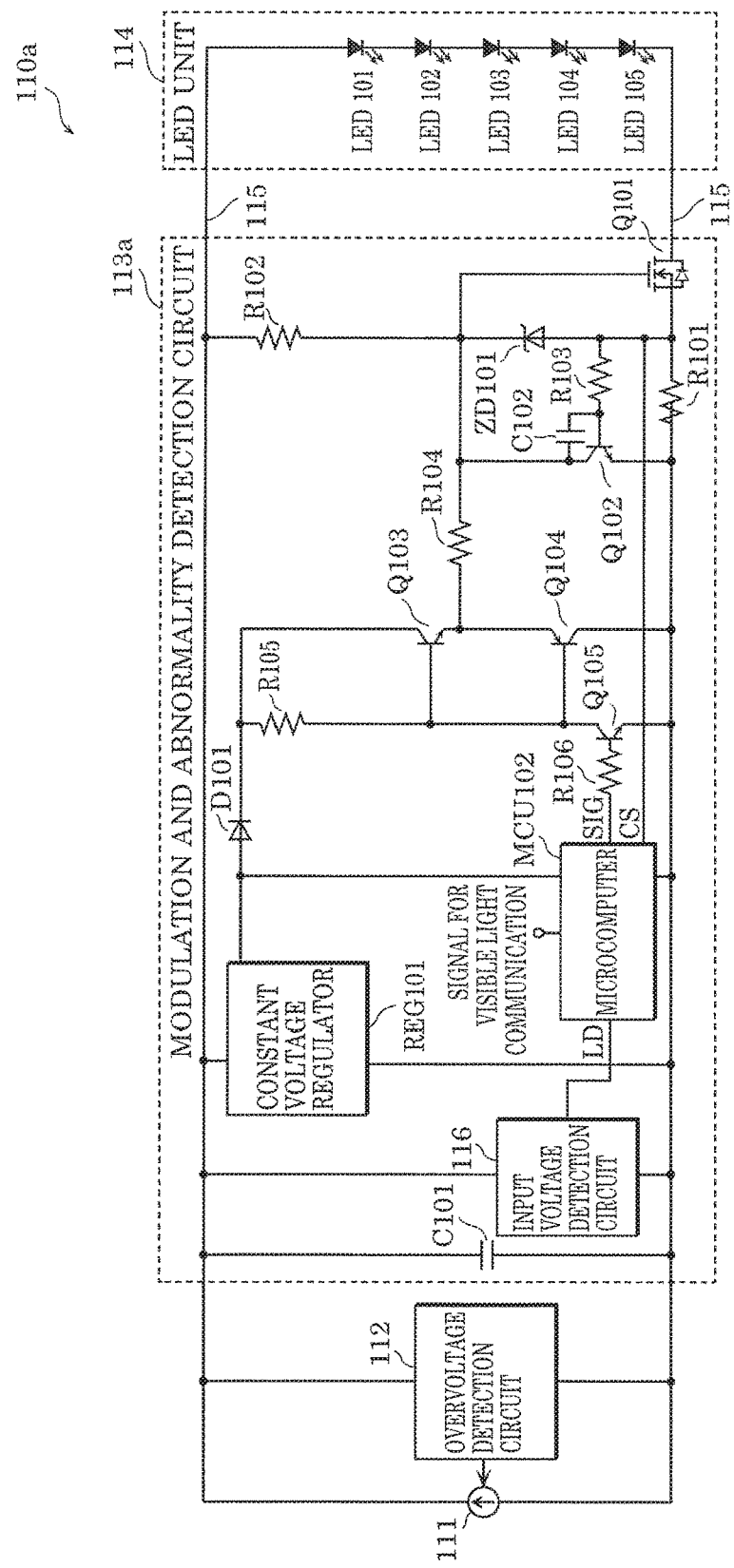
FIG. 7 is a circuit diagram of a lighting device according to Embodiment 4.

FIG. 7 is a circuit diagram of lighting device 110a according to Embodiment 4. As in Embodiment 3, lighting device 110a is a device that has a function of supplying current to (i.e., causing the light emission of) LED unit 114 as well as a function of performing visible light communication, and includes constant current source 111, overvoltage detection circuit 112, and modulation and abnormality detection circuit 113a. Lighting device 110a basically has the functions of lighting device 110 according to Embodiment 3 but is different from Embodiment 3 in that modulation and abnormality detection circuit 113a further detects a low voltage abnormality (or a short-circuit abnormality) as an abnormal state. Hereinafter, description shall be focused on the points of difference with Embodiment 3.

Modulation and abnormality detection circuit 113a corresponds to modulation and abnormality detection circuit 113 according to Embodiment 3 to which input voltage detection circuit 116 is added and microcomputer MCU101 is replaced with microcomputer MCU 102 which has a new function added.

Input voltage detection circuit 116 is part of an abnormality detection circuit, and detects when the input voltage of modulation and abnormality detection circuit 113a, that is, the output voltage of constant current source 111 is in a low voltage state. Specifically, when input voltage detection circuit 116 detects, as the low voltage state, a state in which the output voltage of constant current source 111 falls below a second predetermined value less than the first predetermined value, input voltage detection circuit 116 outputs a detection signal indicating such state to microcomputer MCU102. The second predetermined value is a threshold for detecting output voltage in the case where the load of lighting device 110a is short-circuited, and is for example 10 V. Input voltage detection circuit 116 includes, for example, a resistance voltage-dividing circuit that detects the output voltage, a constant current diode that determines the second predetermined value, a comparator that compares the voltage obtained by the resistance voltage-dividing circuit and the voltage obtained by the constant voltage diode, etc.

As part of the abnormality detection circuit, microcomputer MCU102 has, in addition to the functions of microcomputer MCU101 according to Embodiment 3, a function of determining that an abnormal state (i.e., a low voltage abnormality) has occurred when the detection signal from input voltage detection circuit 116 continues for at least a second predetermined time period. Specifically, microcomputer MCU102 includes input terminal LD for receiving the detection signal from input voltage detection circuit 116, and determines, using an internal counter for delay detection, whether the state in which detection signal is inputted to input terminal LD has continued for at least the second predetermined time period. Then, when microcomputer MCU102 determines that the inputting of the detection signal has continued for at least the second predetermined time period, microcomputer MCU102 determines that an abnormal state (i.e., a low voltage abnormality) has occurred, and performs control to cause transistor Q101 to switch OFF for at least the first predetermined time period. The second predetermined time period is a minimum duration for confirming that the output voltage continues to be in the low voltage state due to load short-circuiting, and is for example 10 msec.

Next, the operation of lighting device 110a according to Embodiment 4 configured as described above will be described.

Figure 8:
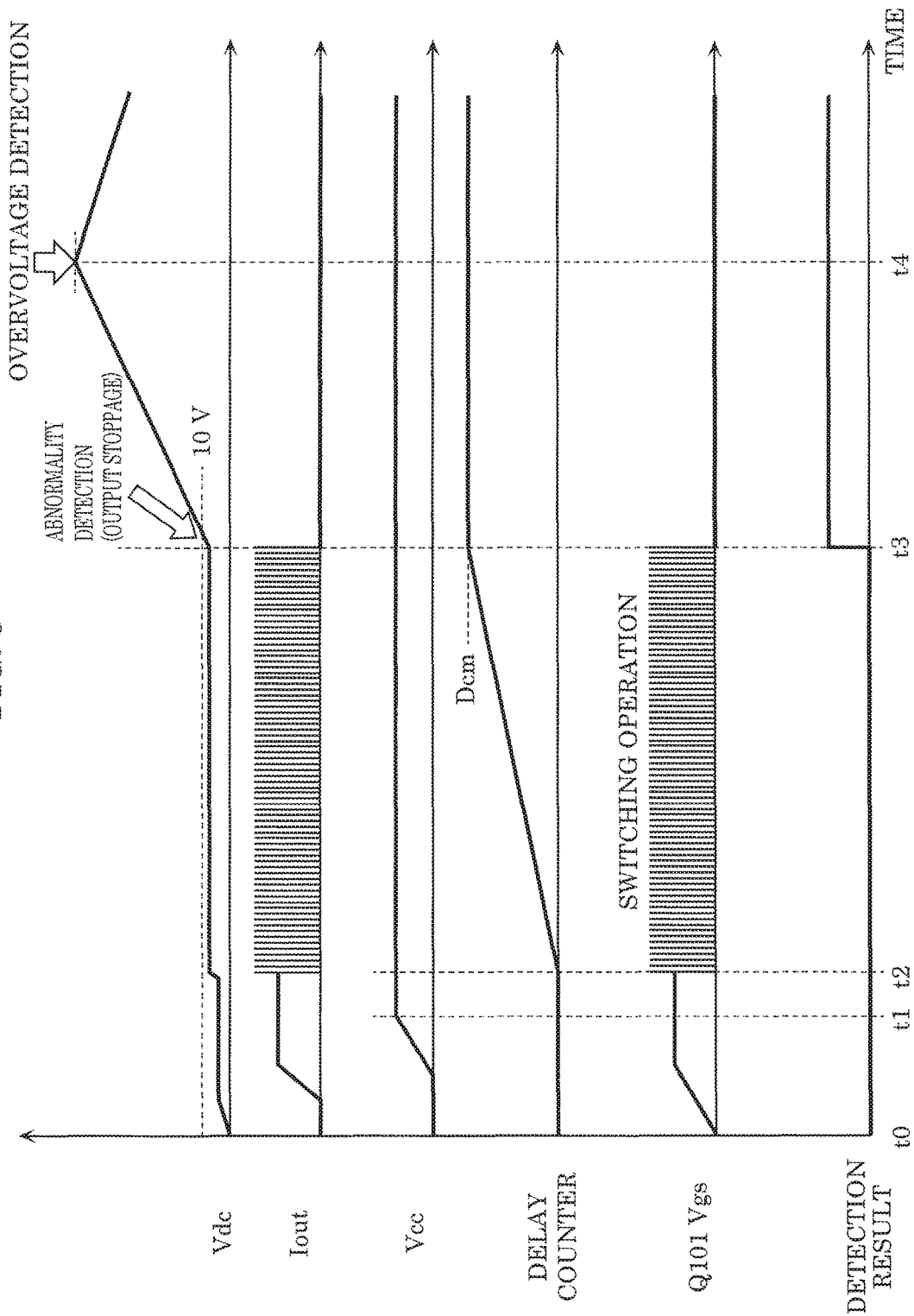
FIG. 8 is a timing chart illustrating an operation of the lighting device according to Embodiment 4.

FIG. 8 is a timing chart illustrating the operation of lighting device 110a according to Embodiment 4. The figure illustrates, from the top, output voltage Vdc of constant current source 111, current Iout flowing through LED unit 114, power source voltage Vcc outputted by constant voltage regulator REG101, the value of the counter for delay detection (delay counter) of microcomputer MCU102, gate-source voltage Vgs(Q101) of transistor Q101, and the "detection result" of microcomputer MCU102. It should be noted that in the "detection result", HIGH is the state in which an abnormal state is detected and LOW is the state in which an abnormal state is not detected.

At time t0, constant current source 111 starts outputting.

From time t0 to t1, capacitor C101 is charged, and output voltage Vdc of constant current source 111 starts to rise. When output voltage Vdc reaches approximately 5 V, transistor Q101 is biased via resistor R102 and switches ON. Now, the load is short-circuited and is in an abnormal state. In this state, when transistor Q101 switches ON, the current flowing through transistor Q101 is fixed to the set point of constant current source 111. Since transistor Q101 is a MOSFET, output voltage Vdc stabilizes at a voltage (for example, 4 V) greater than or equal to threshold voltage Vth of transistor Q101. In this state, in transistor Q101, there is a loss represented by: current Iout×output voltage Vdc. For example, where Iout is 2 A, and output voltage Vdc is 4 V, a thermal loss of 8 W occurs in transistor Q101 which may lead to element breakdown of transistor Q101 if this state continues. It should be noted that, at this timing, constant voltage regulator REG101 starts to output a low power source voltage Vcc.

At time t1, microcomputer MCU102 begins to start up. It should be noted that, when constant voltage regulator REG101 is a series regulator, the potential difference between the input and the output of constant voltage regulator REG101 becomes 1 to 2 V, and thus microcomputer MCU102 begins to start up at a power source voltage of approximately 2 V.

From time t2 to t3, microcomputer MCU102 is released from the reset state, and, as part of the modulation circuit and in accordance with an internal program, outputs, from output terminal SIG, a drive signal for causing transistor Q101 to switch ON and OFF periodically based on a signal for visible light communication. Furthermore, since input voltage detection circuit 116 monitors output voltage Vdc and detects the state in which output voltage Vdc falls below the second predetermined value which is less than the first predetermined value, input voltage detection circuit 116 outputs a detection signal indicating such state to microcomputer MCU102. As part of the abnormality detection circuit, microcomputer MCU102 counts a delay time period, using an internal counter for delay detection (delay counter), in order to determine whether the detection signal from input voltage detection circuit 116 that is inputted to input terminal LD continues for at least the second predetermined time period. It should be noted that, in this period, the switching of transistor Q101 causes output voltage Vdc to rise during the OFF period of transistor Q101, and thus the average voltage of output voltage Vdc rises.

At time t3, microcomputer MCU102 detects that the counter (delay counter) has reached threshold Dcm corresponding to the second predetermined time period, determines that a low voltage state has occurred, and performs control to cause transistor Q101 to switch OFF for at least the first predetermined time period. When transistor Q101 switches OFF, current Iout flowing through LED unit 114 becomes zero, and output voltage Vdc rises. The second predetermined time period is at least a time period required for output voltage Vdc to reach a voltage (i.e., the first predetermined value) that would be determined as an overvoltage by overvoltage detection circuit 112, and is for example 10 msec.

At time t4, when output voltage Vdc reaches the first predetermined value (for example, 86 V), overvoltage detection circuit 112 determines that an overvoltage has been generated, and performs output suppression control by controlling constant current source 111. Specifically, by controlling constant current source 111, overvoltage detection circuit 112 performs output suppression control to stop operation of constant current source 111 or reduce the current outputted by constant power source 111 (here, the operation of constant current source 111 is stopped).

In this manner, in lighting device 110a according to this embodiment, the abnormality detection circuit (i.e., modulation and abnormality detection circuit 113a) detects a low voltage abnormality as an abnormal state, in addition to the abnormal state in Embodiment 3. Specifically, modulation and abnormality detection circuit 113a detects when the state in which the output voltage falls below the second predetermined value, which is less than the first predetermined value, continues for at least the second predetermined time period, as an abnormal state. Then, when modulation and abnormality detection circuit 113a detects an abnormal state, modulation and abnormality detection circuit 113a causes transistor Q101 to switch OFF for at least the first predetermined time period.

Accordingly, when it is detected that the state in which the output voltage of constant current source 111 falls below the second predetermined value, which is less than the first predetermined value, due to short-circuiting of LED unit 114 continues for at least the second predetermined time period, transistor Q101 is kept OFF. As a result, the output voltage of constant current source 111 exceeds the first predetermined value, overvoltage detection circuit 112 detects this and performs output suppression control. Therefore, even when an abnormal state such as the short-circuiting of a load occurs, breakdown of transistor Q101 due to power stress when transistor Q101 is in an incomplete ON state is prevented.

Embodiment 5

Next, application examples of lighting devices 10, 10a, 110, and 110a according to the foregoing embodiments are described as Embodiment 5.

Figure 9:
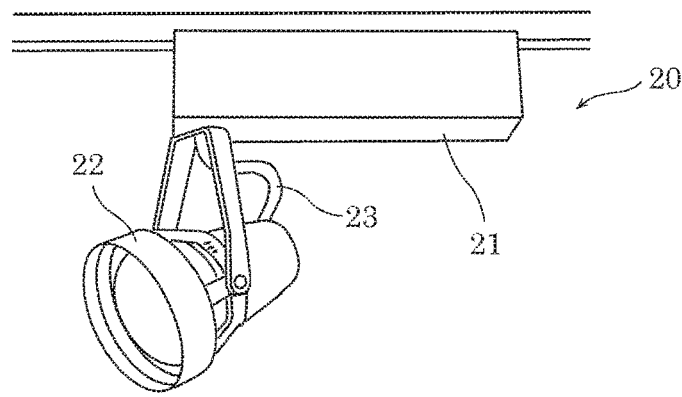
FIG. 9 is an external view of a luminaire according to an application example in Embodiment 5.

FIG. 9 is an external view of luminaire 20 according to an application example in Embodiment 5. Luminaire 20 is a spotlight that is mounted on the ceiling, a wall, or a column of a room, and includes circuit box 21, lamp body 22, and wiring 23. Circuit box 21 is a box that houses lighting device 10, 10a, 110, or 110a according to the foregoing embodiments. Lamp body 22 houses an LED light bulb as a light emitting element. Wiring 23 is an example of a load line that electrically connects circuit box 21 and the LED light bulb housed in lamp body 22.

Luminaire 20 as described above includes lighting device 10, 10a, 110, or 110a according to the foregoing embodiments, and thus performs illumination and visible light communication at the same time. Furthermore, even when an abnormal state occurs, such as when a connection defect, etc., causes the LED light bulb to be detached from lamp body 22 and then attached to lamp body 22 during light emission, breakdown of the circuit elements included in lighting device 10, 10a, 110, or 110a is prevented.

It should be noted that although a spot light is illustrated in the figure as luminaire 20, the luminaire according to the application example of lighting device 10, 10a, 110, or 110a is not limited to a spotlight. Luminaire 20 may be a chandelier, a ceiling light, a stand light, a Japanese-style light, a bracket light, a foot light, a pendant light, a base light, a downlight, a kitchen light, a bathroom light, an exterior light, etc.

Figure 10:
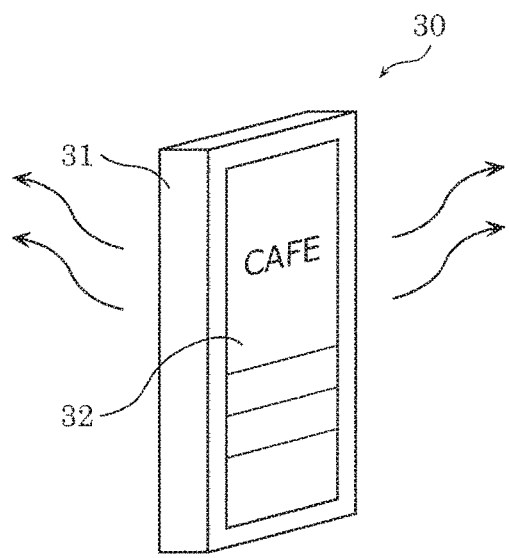
FIG. 10 is an external view of a sing board according to an application example in Embodiment 5.

FIG. 10 is an external view of signboard 30 according to an application example in Embodiment 5. Signboard 30 includes display panel 32 and housing 31 which houses an LED light bulb (not illustrated in the figure) as a light emitting element and lighting device 10, 10a, 110, or 110a (not illustrated in the figure) according to the foregoing embodiments that supplies current to the LED light bulb. Display panel 32 is a display panel that is illuminated from the back side by the LED light bulb so as to display at least one of a text character and a drawing, and is for example a transparent resin panel on which text characters are inscribed.

Signboard 30 as described above includes lighting device 10, 10a, 110, or 110a according to the foregoing embodiments, and thus performs display of text characters, etc., using display panel 32 and visible light communication at the same time. In visible light communication, for example, data indicating the text character displayed on display panel 32 and/or data indicating the placement location of signboard 30 is transmitted by being superimposed onto the illumination light. Furthermore, according to signboard 30 as described above, even when an abnormality occurs, such as when a connection defect, etc., causes LED light bulb and lighting device 10, 10a, 110, or 110a to be disconnected and reconnected during light emission, breakdown of circuit elements included in lighting device 10, 10a, 110, or 110a is prevented It should be noted that although the LED serving as the light emitting element and display panel 32 are separate in signboard 30 in FIG. 10, they may be integrated into a single body. A plurality of LEDs may be arranged side-by-side inside housing 31, and, as a display panel, the plurality of LEDs may be made to display at least one of a text character or a drawing by controlling the color of light emitted by the plurality of LEDs.

Although lighting devices, luminaires, and signboards according to the present disclosure have been described based on Embodiments 1 to 5, the present disclosure is not limited to these embodiments, the present disclosure is not limited to these embodiments. Forms obtained by various modifications to Embodiments 1 to 5 that can be conceived by a person of skill in the art as well as other forms realized by combining part of the structural components in Embodiments 1 to 5, which are within the scope of the essence of the present disclosure are included in the present disclosure.

For example, capacitor C1 is provided in modulators 13 and 13a in Embodiments 1 and 2, but is not limited to this position. As long as capacitor C1 is connected between the output terminals of constant current source 11, capacitor C1 may be provided inside constant current source 11, or may be connected at a position between constant current source 11 and modulator 13 or 13a.

Furthermore, bypass circuit 16 is formed using a discreet circuit using a transistor in Embodiment 2, but may be formed using an operational amplifier.

Furthermore, bypass circuit 16 is provided in modulator 13a in Embodiment 2 but is not limited to this position. As long as bypass circuit 16 is connected between the output terminals of constant current source 11, bypass circuit 16 may be provided inside constant current source 11, or may be connected at a position between constant current source 11 and modulator 13a.

Furthermore, although microcomputers MCU101 and MCU102 function as part of the modulation circuit and also function as part of the abnormality detection circuit in Embodiments 3 and 4, the form for implementing the modulation circuit and the abnormality detection circuit is not limited to such. For example, the modulation circuit may be realized using a microcomputer, and the abnormality detection circuit may be realized using a circuit different from a microcomputer that uses a comparator, etc.

Furthermore, capacitor C101 is provided in modulation and abnormality detection circuits 113 and 113a in Embodiments 3 and 4, but is not limited to this position. As long as capacitor C101 is connected between the output terminals of constant current source 111, capacitor C101 may be provided inside constant current source 111, or may be connected at a position between constant current source 111 and modulation and abnormality detection circuits 113 or 113a.

Furthermore, although in Embodiment 4, in order to detect a low voltage abnormality, input voltage detection circuit 116 detects a low voltage state and microcomputer MCU102 detects if the low voltage state continues for at least the second predetermined time period, the method of implementation is not limited to such. Input voltage detection circuit 116 may divide the output voltage of constant current source 111, and microcomputer MCU102 may detect a low voltage state by comparing voltage resulting from the voltage division with the second predetermined value, and detect if the low voltage state continues for at least the second predetermined time period. Alternatively, input voltage detection circuit 116 may detect a low voltage state, and also detect if the low voltage state continues for at least the second predetermined time period.

Furthermore, although Embodiments 3 and 4 describe examples of avoiding circuit element stress breakdown, even in the case where an abnormality in the ROM of the microcomputer causes an abnormality in a program stored in the ROM, the microcomputer may determine the abnormal state and cause transistor Q101 to switch OFF. Accordingly, it is possible to prevent an erroneous modulation signal from being outputted by visible light communication.

What is claimed is:

1. A lighting device that is for supplying current to a light emitting element and is connected to a constant current source having output terminals to which a capacitor is connected, the lighting device comprising:
   a switch element connected in parallel with the capacitor and connected in series with the light emitting element;
   a modulation circuit that causes the switch element to switch ON and OFF based on a signal for visible light communication; and
   a constant current control circuit that: performs control to maintain a current flowing through the switch element at a constant current of a second predetermined value while the switch element is ON when the current flowing through the switch element is greater than a first predetermined value, and does not perform the control when the current flowing through the switch element is not greater than the first predetermined value.

2. The lighting device according to claim 1, wherein
   the switch element is a first transistor, and
   the constant current control circuit maintains the current flowing through the first transistor at the constant current by controlling a voltage of a control terminal of the first transistor.

3. The lighting device according to claim 2, wherein
   the constant current control circuit includes:
   a resistor connected in series with the switch element; and
   a second transistor that controls the voltage of the control terminal of the first transistor according to a voltage generated across the resistor.

4. The lighting device according to claim 2, wherein
   the constant current control circuit includes:
   a resistor connected in series with the switch element; and
   a constant voltage diode connected between an end of the resistor and the control terminal of the first transistor.

5. The lighting device according to claim 1, further comprising:
   a bypass circuit that is connected to the output terminals of the constant current source, and causes part of a current flowing to the light emitting element and the switch element to instead bypass the light emitting element and the switch element, wherein
   the bypass circuit causes the part of the current flowing to the light emitting element and the switch element to instead bypass the light emitting element and the switch element when the current flowing to the light emitting element and the switch element is greater than a second predetermined value.

6. A luminaire, comprising:
   a light emitting element; and
   the lighting device according to claim 1, the lighting device supplying current to the light emitting element.

7. A signboard, comprising:
   a light emitting element;
   the lighting device according to claim 1, the lighting device supplying current to the light emitting element; and
   a display panel that is illuminated by the light emitting element, and displays at least one of a text character and a drawing.

8. A lighting device that is for supplying current to a light emitting element and is connected to a constant current source having output terminals to which a capacitor is connected, the lighting device comprising:
   a constant current source;
   a capacitor connected to output terminals of the constant current source;
   a series circuit connected in parallel with the capacitor and including a load line and a switch element that are configured to be connected in series with the light emitting element;
   a modulation circuit that causes the switch element to switch ON and OFF based on a signal for visible light communication;
   an overvoltage detection circuit that detects when an output voltage of the constant current source exceeds a first predetermined value, and, upon detecting that the output voltage exceeds the first predetermined value, performs output suppression control to stop operation of the constant current source or to reduce the output of the constant current source; and
   an abnormality detection circuit that detects an abnormal state, and, upon detecting the abnormal state, causes the switch element to switch OFF for at least a first predetermined time period, the abnormal state being at least one of an abnormality in the light emitting element, an abnormality in the load line, an abnormality in the modulation circuit, and an overloading of the switch element, wherein
   the constant current source causes the output voltage to rise until the output voltage exceeds the first predetermined value, when the abnormality detection circuit causes the switch element to switch OFF for at least the first predetermined time period.

9. The lighting device according to claim 8, wherein
   the abnormality detection circuit further detects, as the abnormal state, when a state in which the output voltage falls below a second predetermined value continues for at least a second predetermined time period, the second predetermined value being less than the first predetermined value.

10. The lighting device according to claim 8, wherein
    the overvoltage detection circuit terminates the output suppression control when the output voltage falls below a third predetermined value after exceeding the first predetermined value or when a third predetermined time period passes after the output voltage exceeds the first predetermined value, the third predetermined value being less than the first predetermined value.

11. The lighting device according to claim 8, wherein
    the abnormality detection circuit terminates detection of the abnormal state when the output voltage falls below a fourth predetermined value after exceeding the first predetermined value or when a fourth predetermined time period passes after the output voltage exceeds the first predetermined value, the fourth predetermined value being less than the first predetermined value.

12. A luminaire, comprising:
a light emitting element; and
the lighting device according to claim 8, the lighting device supplying current to the light emitting element.

13. A signboard, comprising:
a light emitting element;
the lighting device according to claim 8, the lighting device supplying current to the light emitting element; and
a display panel that is illuminated by the light emitting element, and displays at least one of a text character and a drawing.

* * * * *